United States Patent
Khoryaev et al.

(10) Patent No.: US 11,736,325 B2
(45) Date of Patent: *Aug. 22, 2023

(54) ENHANCED PHYSICAL STRUCTURE FOR LTE V2V COMMUNICATIONS

(71) Applicant: Apple Inc., Cupertino, CA (US)

(72) Inventors: Alexey Khoryaev, Nizhny Novgorod (RU); Andrey Cheryakov, Nizhny Novgorod (RU); Dmitry Belov, Nizhny Novgorod (RU); Mikhail Shilov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,238

(22) Filed: Aug. 24, 2022

(65) Prior Publication Data
US 2023/0075631 A1 Mar. 9, 2023

Related U.S. Application Data

(63) Continuation of application No. 15/751,262, filed as application No. PCT/US2015/000466 on Dec. 26, 2015, now Pat. No. 11,431,537.
(Continued)

(51) Int. Cl.
*H04L 27/26* (2006.01)
*H04W 72/04* (2023.01)
(Continued)

(52) U.S. Cl.
CPC .... *H04L 27/26025* (2021.01); *H04L 27/2602* (2013.01); *H04W 72/04* (2013.01);
(Continued)

(58) Field of Classification Search
CPC ........... H04L 27/26025; H04L 27/2602; H04L 5/0007; H04L 27/2626; H04W 72/04; H04W 4/46; H04W 4/44
See application file for complete search history.

(56) References Cited

U.S. PATENT DOCUMENTS

2007/0254662 A1 11/2007 Khan
2010/0260164 A1 10/2010 Moon
(Continued)

FOREIGN PATENT DOCUMENTS

WO 2014/065563 A1 5/2014

OTHER PUBLICATIONS

3GPP TS 36.211 V12.7.0 (Sep. 2015); "3rd Generation Partnership Project; Technical Specification Group Radio Accesi 1 Network; Evolved Universal Terrestrial Radio Access (E-UTRA); Physical channels and modulation (Release 12)"; Sep. 2015.
(Continued)

*Primary Examiner* — Christopher M Crutchfield
*Assistant Examiner* — Tito Q Pham
(74) *Attorney, Agent, or Firm* — Eschweiler & Potashnik, LLC

(57) ABSTRACT

A vehicle may wirelessly communicate with another vehicle via a physical channel (a vehicle-to-vehicle (V2V) channel) that is robust and reliable under high mobility propagation conditions. The physical channel may be created by modifying an existing long-term evolution (LTE) physical channel, such as an LTE sidelink (SL) channel. For instance, the V2V physical channel may be created by increasing, by a particular factor, the subcarrier spacing of legacy LTE channels (e.g., from 15 kilohertz (kHz) to 30 kHz). Additionally, a symbol duration and a fast physical channel may each be reduced by Fourier transform (FFT) size for the V2V the same factor. Doing so may enable the V2V physical channel to be implemented without significant modifications to other aspects of the LTE standard.

21 Claims, 13 Drawing Sheets

| Channel Characteristic | Legacy LTE Channel Numerology | V2V Channel Numerology |
|---|---|---|
| Subcarrier Spacing | 15 kHz | 60 kHz |
| Supported Bandwidths | 1.4, 3, 5, 10, 15, and 20 MHz | 1.4, 3, 5, 10, 15, and 20 MHz |
| FFT Size | 128, 256, 512, 1024, 1536, and 2048 MHz | 64, 128, 256, 512, 768, and 1024 MHz |
| Sampling Time (Ts) | 32.55 ns | 32.55 ns |
| Symbol Duration (OFDM / SC-FDMA) | Normal CP, symbol 0: ((160+2048) x Ts)<br>Normal CP, symbols 1-6: ((144+2048) x Ts)<br>Extended CP: ((512+2048) x Ts) | Normal CP, symbol 0: ((160+2048) x Ts)/4<br>Normal CP, symbols 1-6: ((144+2048) x Ts)/4<br>Extended CP: ((512+2048) x Ts)/4 |
| Single Timeslot Duration | 0.5 ms<br>(7 symbols for Normal CP)<br>(6 symbols for Extended CP) | 0.125 ms<br>(7 symbols for Normal CP)<br>(6 symbols for Extended CP |
| Single Subframe Duration | 1.0 ms | 0.5 or 1.0 ms |
| Subcarriers per PRB (Frequency REs) | 12 subcarriers per PRB | 3, 6, or 12 subcarriers per PRB |

Related U.S. Application Data

(60) Provisional application No. 62/203,301, filed on Aug. 10, 2015.

(51) Int. Cl.
*H04W 4/46* (2018.01)
*H04W 4/44* (2018.01)
*H04L 5/00* (2006.01)

(52) U.S. Cl.
CPC ........ *H04L 5/0007* (2013.01); *H04L 27/2626* (2013.01); *H04W 4/44* (2018.02); *H04W 4/46* (2018.02)

(56) References Cited

U.S. PATENT DOCUMENTS

| | | |
|---|---|---|
| 2011/0238987 A1 | 9/2011 | Kherani |
| 2015/0180622 A1 | 6/2015 | Yoo et al. |
| 2015/0181597 A1* | 6/2015 | Malladi .................... H04J 11/00 370/329 |
| 2015/0282178 A1 | 10/2015 | Kim et al. |
| 2016/0057768 A1 | 2/2016 | Sun |
| 2017/0078058 A1 | 3/2017 | Marinier |
| 2017/0318022 A1 | 11/2017 | Perez |
| 2017/0318565 A1 | 11/2017 | Golitschek Edler von Elbwart |
| 2018/0192420 A1 | 7/2018 | Hao |
| 2020/0287607 A1 | 9/2020 | Noh |

OTHER PUBLICATIONS

3GPP RAN Meeting #68, RP-151109, "New SI proposal: Feasibility Study on LTE-based V2X Services", LG Electronics, CATT, Vodafone, Huawei; Jun. 2015.

Erik Dahlman et al., "Physical Transmission Resources (Chapter 9)" in "4G: LTE/L TE-Advanced for Mobile Broadband (second edition) [Kindle Edition]", pp. 141-159, Oct. 2013, ISBN: 978-0-12-419997-2. https://www.sciencedirect.com/book/9780124199859/4g-lte-lte-advanced-for-mobile-broadband.

Petar Popovski et al., "Deliverable D2 Proposed solutions for new radio access", Feb. 38, 2015.

Non-Final Office Action dated Jan. 22, 2021 in connection with U.S. Appl. No. 15/751,262.

Non-Final Office Action dated Dec. 27, 2021 in connection with U.S. Appl. No. 15/751,262.

Notice of Allowance dated Apr. 14, 2022 in connection with U.S. Appl. No. 15/751,262.

* cited by examiner

V2V Numerology for Normal CP

1 PRB = 12 Frequency REs and 1 timeslot

1 PRB Pair = 12 Frequency REs and 2 timeslots

1 PRB = 6 Frequency REs and 1 timeslot

1 PRB Pair = 6 Frequency REs and 2 timeslots

V2V Numerology for Extended CP

1 PRB = 12 Frequency Res and 1 timeslot

1 PRB Pair = 12 Frequency Res and 2 timeslots

1 PRB = 6 Frequency REs and 1 timeslot

1 PRB Pair = 6 Frequency REs and 2 timeslots

| Channel Characteristic | Legacy LTE Channel Numerology | V2V Channel Numerology |
|---|---|---|
| Subcarrier Spacing | 15 kHz | 30 kHz |
| Supported Bandwidths | 1.4, 3, 5, 10, 15, and 20 MHz | 1.4, 3, 5, 10, 15, and 20 MHz |
| FFT Size | 128, 256, 512, 1024, 1536, and 2048 MHz | 64, 128, 256, 512, 768, and 1024 MHz |
| Sampling Time (Ts) | 32.55 ns | 32.55 ns |
| Symbol Duration (OFDM / SC-FDMA) | Normal CP, symbol 0: ((160+2048) x Ts)<br>Normal CP, symbols 1-6: ((144+2048) x Ts)<br>Extended CP: ((512+2048) x Ts) | Normal CP, symbol 0: ((160+2048) x Ts)/2<br>Normal CP, symbols 1-6: ((144+2048) x Ts)/2<br>Extended CP: ((512+2048) x Ts)/2 |
| Single Timeslot Duration | 0.5 ms<br>(7 symbols for Normal CP)<br>(6 symbols for Extended CP) | 0.25 ms<br>(7 symbols for Normal CP)<br>(6 symbols for Extended CP) |
| Single Subframe Duration | 1.0 ms | 0.5 or 1.0 ms |
| Subcarriers per PRB (Frequency REs) | 12 subcarriers per PRB | 6 or 12 subcarriers per PRB |

Fig. 10

| Channel Characteristic | Legacy LTE Channel Numerology | V2V Channel Numerology |
|---|---|---|
| Subcarrier Spacing | 15 kHz | 60 kHz |
| Supported Bandwidths | 1.4, 3, 5, 10, 15, and 20 MHz | 1.4, 3, 5, 10, 15, and 20 MHz |
| FFT Size | 128, 256, 512, 1024, 1536, and 2048 MHz | 64, 128, 256, 512, 768, and 1024 MHz |
| Sampling Time (Ts) | 32.55 ns | 32.55 ns |
| Symbol Duration (OFDM / SC-FDMA) | Normal CP, symbol 0: ((160+2048) x Ts) <br> Normal CP, symbols 1-6: ((144+2048) x Ts) <br> Extended CP: ((512+2048) x Ts) | Normal CP, symbol 0: ((160+2048) x Ts)/4 <br> Normal CP, symbols 1-6: ((144+2048) x Ts)/4 <br> Extended CP: ((512+2048) x Ts)/4 |
| Single Timeslot Duration | 0.5 ms <br> (7 symbols for Normal CP) <br> (6 symbols for Extended CP) | 0.125 ms <br> (7 symbols for Normal CP) <br> (6 symbols for Extended CP) |
| Single Subframe Duration | 1.0 ms | 0.5 or 1.0 ms |
| Subcarriers per PRB (Frequency REs) | 12 subcarriers per PRB | 3, 6, or 12 subcarriers per PRB |

Fig. 11

ENHANCED PHYSICAL STRUCTURE FOR LTE V2V COMMUNICATIONS

RELATED APPLICATIONS

This application is a continuation of U.S. application Ser. No. 15/751,262 filed on Feb. 8, 2018, which is a National Phase entry application of International Patent Application No. PCT/US2015/000466 filed, which claims priority U.S. Provisional Application 62/203,301 filed Aug. 10, 2015, entitled "ENHANCED PHYSICAL SIGNAL STRUCTURE FOR LTE V2V COMMUNICATIONS", which is hereby incorporated by reference in its entirety.

BACKGROUND

The so-called "connected car concept" includes the idea that vehicles may be enabled to communicate wirelessly with one another. The 3GPP (3rd Generation Partnership Project) Long Term Evolution (LTE) communications standard has been proposed as the communication standard for implementing the connected car concept (also referred to as vehicle-to-vehicle (V2V) communications). V2V communications include one vehicle establishing a direct connection with one or multiple other vehicles.

Examples of such connections may include an LTE sidelink connection (also referred as direct connection, a proximity services (ProSe) connection, a device-to-device (D2D) connection, etc.). Once connected, vehicles may communicate a variety of information to each other, such as location information, velocity information, acceleration information, directional information, performance information, and more. Such information may be used to provide a variety of functionalities, such as preventing car accidents, determining driving conditions (e.g., traffic jams, icy roads, car accidents, etc.), determining optimal routes for driving from one location to another, etc.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

FIG. 10 is a table of example characteristics of a legacy LTE numerology and a V2V numerology with 30 kilohertz (kHz) subcarrier spacing;

FIG. 11 is a table of example characteristics of a legacy LTE numerology and a V2V numerology with 60 kHz subcarrier spacing;

DETAILED DESCRIPTION OF PREFERRED EMBODIMENTS

Figure 1:
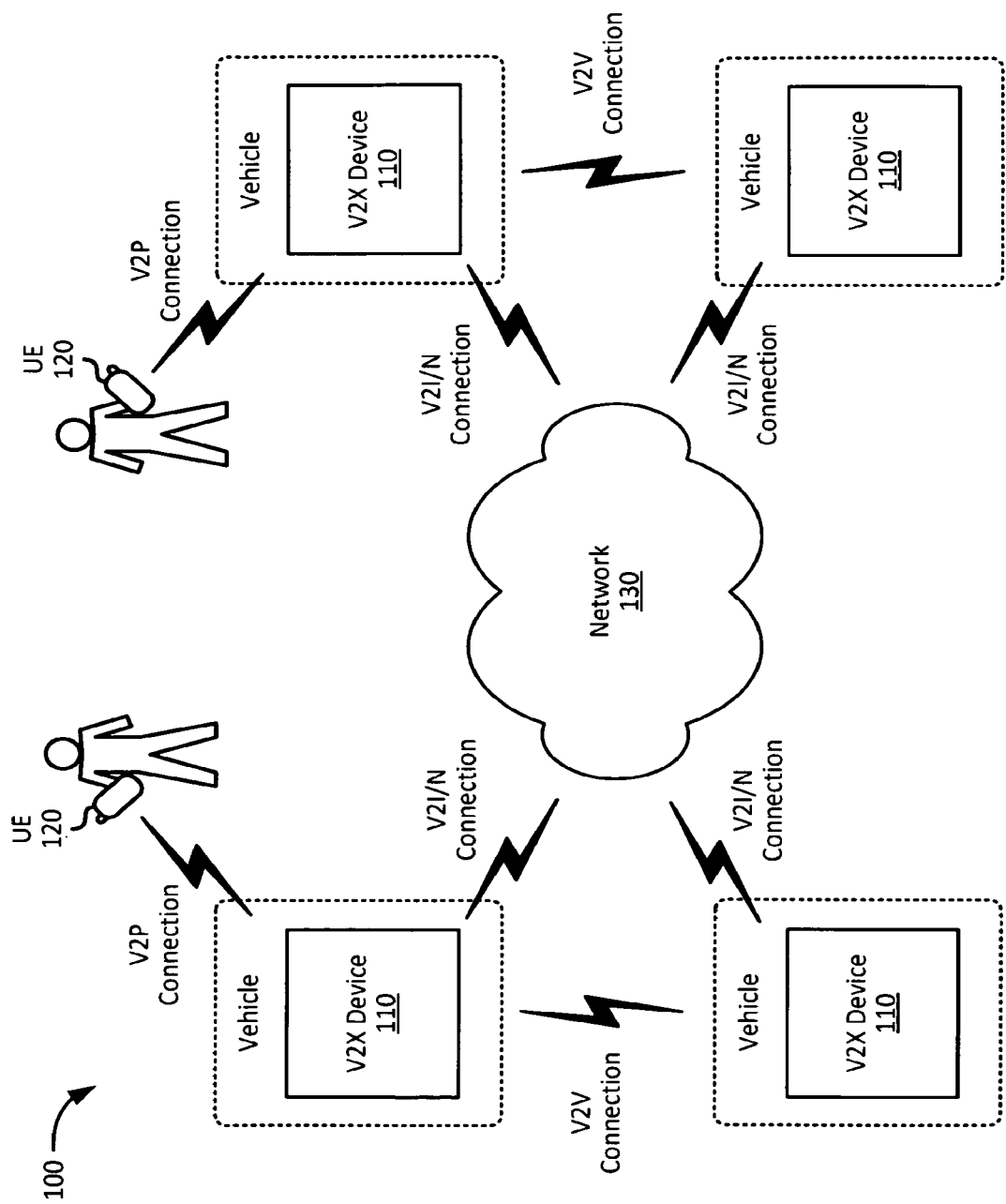
FIG. 1 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments defined by the appended claims and their equivalents.

As mentioned above, the 3GPP (3rd Generation Partnership Project) Long Term Evolution (LTE) communications standard has been proposed as the communication standard for vehicle-to-vehicle (V2V) communications. One reason behind the proposal is the reliability and high data rate capabilities of LTE technology. However, the current LTE standard includes certain limitations when it comes to enabling vehicles to communicate with one another directly. For example, legacy LTE sidelink (SL) physical channels (also referred to as PC5 channels or device-to-device (D2D) channels) are considered to be used or enable V2V communications. At the same time, the legacy SL physical channels were designed with an assumption of substantially lower mobility conditions than the ones considered to be used for V2V communication (e.g., a scenario in which two vehicles are driving toward one another at 140 kilometers per hour (km/h) each). As a result, when subjected to wireless propagation in high mobility conditions (that may cause high Doppler fading and/or frequency shifts), legacy LTE physical channels may experience an unacceptably high block error rate (BLER) performance and/or use an unacceptably high signal-to-interference-noise ratio (SINR) to achieve reliable performance for V2V wireless communication.

Techniques described herein may be used to provide a physical channel (referred to herein as "V2V physical channel") of greater robustness and reliability when subjected to the high mobility conditions of V2V communications. For example, a V2V physical channel may have increased subcarrier spacing (e.g., 30 kilohertz (kHz) subcarriers) instead of the 15 kHz subcarrier spacing used in legacy LTE SL physical channels. The increased subcarrier spacing may improve physical channel robustness (particularly under high mobility wireless propagation effects) via a reduction of the impacts of frequency offset errors on the subcarriers orthogonality, reduced channel variations on the packet transmission duration, etc.

In some embodiments, the V2V physical channel may include additional alterations from current LTE SL physical channels. For example, the V2V physical channel may include a reduced symbol duration (e.g., a single-carrier frequency-division multiple access (SC-FDMA) symbol duration, etc.). The decrease in symbol duration may be proportional to the increased subcarrier spacing. For instance, if the subcarrier spacing of the V2V physical channel is twice as large as subcarrier spacing of a legacy LTE SL physical channel (e.g., 30 kHz instead of 15 kHz), the symbol duration for the V2V physical channel may be halved. Additionally, the decrease in symbol duration may be accompanied by a similar decrease (e.g., half) to a fast Fourier transform (FTT) size.

Additionally, since LTE air interfaces currently implement physical resource blocks (PRBs) as a fundamental unit of allocation for air interface resources, the techniques described herein may include one or more PRB formats for implementing the enhancements described above regarding modified subcarrier spacing and symbol duration of the V2V physical channels. For instance, a PRB of the V2V physical channel may include time-domain changes, such as a change in the duration of each PRB and/or the number of slots per PRB. Similarly, a PRB of the V2V channel may include frequency-domain changes, such as the number of subcarriers per PRB, the PRB size in terms of frequency, etc. PRB formats may be discussed herein in terms of numerologies (e.g., legacy LTE numerologies and V2V numerologies), which may include a representation of subcarriers, slot durations, and resource elements (REs) of a PRB or PRB pair.

In some embodiments, the techniques described herein may be implemented within the context of cyclic prefixing (CP). For example, in the 3GPP LTE communication standard, CP may include copying a portion of one symbol (e.g., an end portion of the symbol) and adding the copied portion to a beginning portion of the symbol, such that the symbol begins and ends with the same portion. Doing so may, for example, reduce inter-symbol interference.

FIG. 1 is a diagram of an example environment 100 in which systems and/or methods described herein may be implemented. Environment 100 may include one or more vehicles with vehicle-to-X (V2X) devices 110, user equipment devices (UEs) 120, and network 130.

V2X device 110 may include a computing and communication device installed in a vehicle, such as a car, a truck, a sports utility vehicle (SUV), etc. V2X device 110 may be capable of gathering, processing, and communicating information regarding the vehicle in which V2X device 110 is installed. Examples of such information may include vehicle performance information, vehicle location information, vehicle usage information, vehicle status information, vehicle diagnostic information, etc. In some embodiments, V2X device 110 may be capable over gathering, processing, and communicating other types of information, such as information relating to a driver or passenger of the vehicle. V2X device 110 may be an example of user equipment device (UE) or another type of end terminal.

As shown, V2X device 110 may be capable of communicating with one or more networks or devices, such as UE 120, the V2X device of another vehicle, network 130, etc. In some embodiments, V2X device 110 may do so by establishing a connection that is based on a particular communications standard, such as the 3GPP LTE communication standard. For instance, V2X device 110 may establish a vehicle-to-pedestrian (V2P) connection with UE 120, which may include a D2D connection, an LTE SL connection, or other type of direct connection. V2X device 110 may also, or alternatively, establish a vehicle-to-infrastructure/network (V2I) connection with network 130. The V2I connection may include a standard connection with a base station (e.g., an evolved Node B (eNB)), a wireless access point (AP), or another device capable of enabling V2X device 110 to communicate with network 130. As such, the "X" in "V2X device," may represent an ability of V2X device 110 to communicate with one or more types of devices (e.g., other V2X devices, UEs 120, a base station, a network access point (AP), etc.).

Additionally, or alternatively, V2X device 110 may establish a V2V connection with the V2X device of another vehicle. The V2V connection may include a D2D connection, an LTE SL connection, or other type of direct connection between UEs (e.g., a connection that does not, for example, include network 130). In some embodiments, V2X device 110 may be capable of communicating with other V2X devices using one or more of the techniques described herein. For example, V2X device 110 may be capable of using a V2V physical channel that ensure improved robustness and reliability when subjected to the high mobility conditions of V2V communications. The V2V physical channel may, for example, include greater subcarrier spacing and reduced symbol durations to, for example, improve demodulation performance including BLER reduction but still operating within the framework of an established communications standard (such as the 3GPP LTE communications standard).

UE 120 may include a portable computing and communication device, such as a personal digital assistant (PDA), a smart phone, a cellular phone, a laptop computer with connectivity to a cellular wireless network, a tablet computer, etc. UE 120 may also include non-portable computing devices, such as a desktop computer, a consumer or business appliance, or other devices that have the ability to connect to network 130. UE 120 may also include a computing and communication device that may be worn by a user (also referred to as wearable devices) as a watch, a fitness band, a necklace, glasses, an eyeglass, a ring, a belt, a headset, or another type of wearable device. As shown, UE 120 may establish a direct connection (e.g., a D2D connection) with V2X device 110. Additionally, UE 120 may communicate with V2X device 110 regarding the vehicle of V2X device 110, a driver or passenger of the vehicle, a user of UE 120, a location of the vehicle with respect to the user of UE 120, etc.

Network 130 may include one or more wired and/or wireless networks. For example, network 130 may include an LTE network. In some embodiments, network 130 may include one or more additional networks, such as a cellular network (e.g., a second generation (2G) network, a third generation (3G) network, a fourth generation (4G) network, a fifth generation (5G) network, a global system for mobile (GSM) network, a code division multiple access (CDMA) network, an evolution-data optimized (EVDO) network, or the like), a public land mobile network (PLMN), and/or another network. Additionally, or alternatively, network 150 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of system 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Additionally, while some of the techniques described herein may involve V2V communications as an example, the techniques described herein may be applied to various scenarios and/or other types of communications. For example, techniques described herein may be applicable to time division duplexing (TDD) or frequency division duplexing (FDD) communications. In some embodiments, techniques described herein may be applied to all of downlink (DL), uplink (UL), and sidelink (SL) communications, while other embodiments may only apply the techniques described herein to DL or UL or SL communications. Additionally; while the techniques described herein may be described within the context of the 3GPP LTE communications standard, the techniques may also be applied to other communication standards. Additionally, while examples provided herein may include enabling vehicles to communicate with one another more reliably, the techniques described herein may be applied to other scenarios as well (such as another system or device that may experience significant Doppler fading conditions when attempting to communicate wirelessly).

Figure 2:
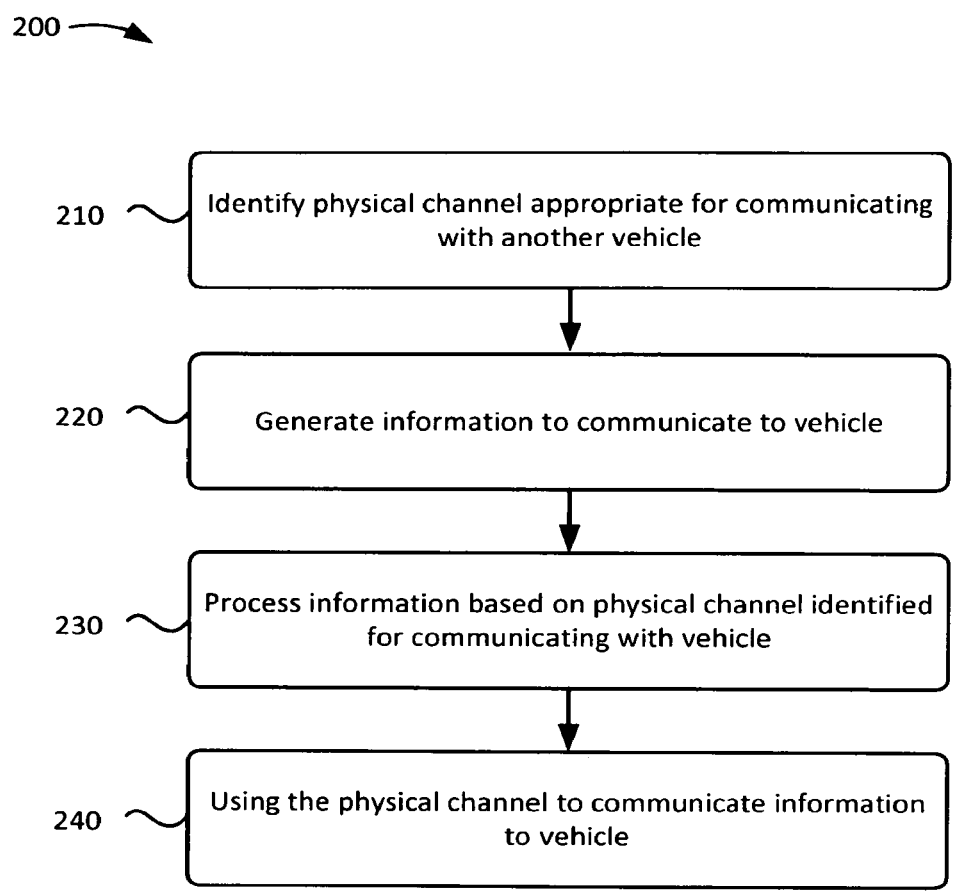
FIG. 2 is a diagram illustrating an example process for sending information to another vehicle.

FIG. 2 is a diagram illustrating an example process 200 for sending information to another vehicle. Process 200 may be particularly appropriate for devices capable of wireless communications that may be subjected to high mobility propagation conditions (e.g., wireless propagation in high mobility conditions characterized by high Doppler fading and/or frequency shifts that may jeopardize the integrity or reliability of the wireless communications). Process 200 may be implemented by, for example, V2X device 110. Additionally, process 200 provides an example of how a V2V physical channel may be used; however, it should be noted that the V2V physical channel, as described herein, may be used in additional and alternative ways, which may include fewer, additional, and/or alternative operations than the operations described below with reference to FIG. 2.

As shown, process 200 may include identifying a physical channel that is appropriate for communicating with another vehicle (block 210). For example, in some embodiments, V2X device 110 may be capable of using multiple physical channels for communicating with another vehicle. As described above, examples of such channels may include an LTE SL physical channel, a V2V physical channel (as described herein), etc. In some embodiments, V2X device 110 may identify the appropriate physical channel based on one or more factors.

Examples of such factors may include whether the physical channel will likely be subjected to high mobility propagation conditions. For instance, if the vehicle of the V2X device 110 and/or the other vehicle are traveling at a high speed, V2X device 110 may determine that communications between the vehicles are likely to be subjected to such conditions. As such, a V2V physical channel (as opposed to, for example, a legacy LTE SL channel) may be appropriate for communicating with the other vehicle.

Another example of a factor that may be considered by V2X device 110 may include the communication capabilities of the other vehicle. For example, V2X device 110 may determine the types of physical channels that the other vehicle is capable of using and select the most appropriate physical channel from on the physical channels that the other vehicle is capable of using. In some embodiments, determining the communication capabilities of the other vehicle may include determining what type of communications device is being implemented by the other vehicle (e.g., a V2X device or another type of communications device).

Additional examples of factors that may be used to identify an appropriate physical channel may include physical channel availability (e.g., whether V2X device is already using one or more physical channels), a measure of importance regarding the information (or type of information) that is to be sent to the other vehicle (e.g., less important information may be allocated with less reliable physical channels), a measure of importance of other information that is to communicated to a different vehicle, etc. In yet another example, V2X device may implement one or more rules for prioritizing which type of physical channel (e.g., an LTE SL channel, a V2V physical channel, etc.) should be implemented in light of one or more of the factors described above.

Process 200 may include generating information to communicate to the vehicle (block 220). For example, V2X device 110 may generate the information that is to be transmitted to the other vehicle. Examples of such information may include vehicle performance information, vehicle location information, vehicle usage information, vehicle status information, vehicle diagnostic information, information relating to a driver or passenger of the vehicle, etc.

Process 200 may include processing the information based on the physical channel identified for communicating with the other vehicle (block 230). For example, V2X device 110 may arrange the information in accordance with a particular PRB format, which may be particular to the type of physical channel identified as the suitable for communicating with the other vehicle. For instance, if the identified physical channel corresponds to a currently available physical channel (such as an LTE LS physical channel), the information may be allocated to accommodate a format where a PRB includes 12 subcarriers (also referred to herein as frequency REs) with 15 kHz subcarrier spacing and 1 slot of 0.5 ms duration in time. However, if the identified physical channel corresponds to a V2V physical channel, the information may be allocated to accommodate a format where a PRB includes 12 subcarriers with 30 kHz subcarrier spacing and 1 slot of 0.25 ms duration in time. Alternatively, for V2V physical channel, the information may be allocated to accommodate a format where a PRB includes 12 subcarriers with 60 kHz subcarrier spacing and 1 slot of 0.125 ms duration in time. Additional examples of PRB formats are discussed below with reference to FIGS. 4-9.

Process 200 may include using the physical channel to communicate information to vehicle (block 240). For example, V2X device 110 may use the physical channel identified as being appropriate for communicating with the vehicle to transmit the information to the vehicle. As described above, the physical channel may include a legacy channel (such as an LTE SL channel) or a V2V physical channel, and the information may be formatted in accordance with a format (e.g., a PRB format) that is particular to the physical channel used to transmit the information.

Figure 3:
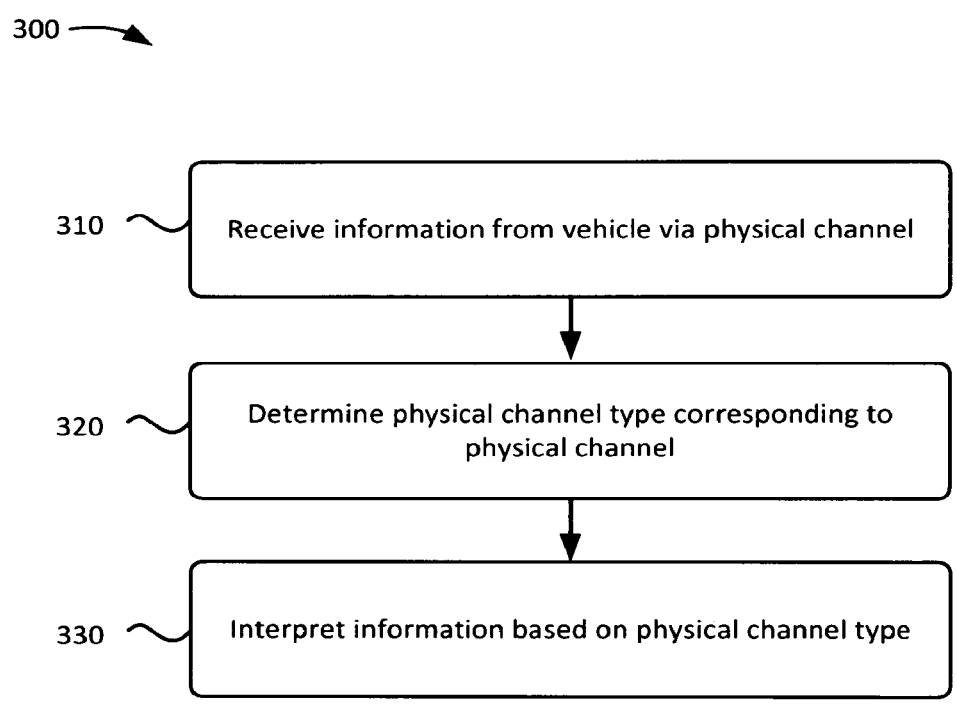
FIG. 3 is a diagram illustrating an example process for receiving information from another vehicle.

FIG. 3 is a diagram illustrating an example process 300 for receiving information from another vehicle. Process 300 may be particularly appropriate for devices capable of wireless communications that may be subjected to high mobility conditions (e.g., that may cause high Doppler fading and/or frequency shifts) during V2V communications. Process 300 may be implemented by, for example, V2X device 110.

As shown, process 300 may include receiving information from another vehicle via a physical channel (block 310). For example, V2X device 110 may be capable of using physical channels for communicating with another vehicle. As described above, examples of such channels may include an LTE SL channel, a V2V physical channel, etc. The information sent and received between vehicles may include vehicle performance information, vehicle location information, vehicle usage information, vehicle status information, vehicle diagnostic information, information relating to a driver or passenger of the vehicle, etc.

Process 300 may include determining a physical channel type corresponding to the physical channel (block 320). For example, V2X device 110 may identify the type of physical channel (e.g., an LTE SL channel, a V2V channel, etc.) used to receive the information. In some embodiments, V2X device 110 may determine the manner in which the information is arranged in the physical channel based on the physical channel type may include. For example, if the physical channel corresponds to an LTE SL physical channel, the information may be formatted into PRBs that include 12 subcarriers with 15 kHz subcarrier spacing and 1 slot of 0.5 ms duration in time. In another example, if the physical channel corresponds to a V2V physical channel, the information may be formatted into PRBs that include 12 subcarriers with 30 kHz subcarrier spacing and 1 slot of 0.25 ms duration in time. Alternatively, for a V2V physical channel, the information may be allocated to accommodate a format where a PRB includes 12 subcarriers with 60 kHz subcarrier spacing and 1 slot of 0.125 ms duration in time. Additional examples of PRB formats are discussed below with reference to FIGS. 4-9.

Process 300 may include interpreting the information based on the physical channel type of the physical channel (block 330). For example, V2X device 110 may interpret the information, received from another vehicle, based on a type of physical channel used to communicate the information. For instance, if the physical channel corresponds to an LTE LS physical channel, the information may be interpreted based on the assumption that the information was formatted into PRBs that include 12 subcarriers with 15 kHz subcarrier spacing and 1 slot of 0.5 ms duration in time. By contrast, if the physical channel corresponds to a V2V physical channel, the information may be interpreted based on the assumption that the information was formatted into PRBs that include 12 subcarriers with 30 kHz subcarrier spacing and 1 slot of 0.25 ms duration in time. Alternatively, for V2V physical channel, the information may be interpreted based on the assumption that the information was formatted into PRBs that include 12 subcarriers with 60 kHz subcarrier spacing and 1 slot of 0.125 ms duration in time.

Figure 4:
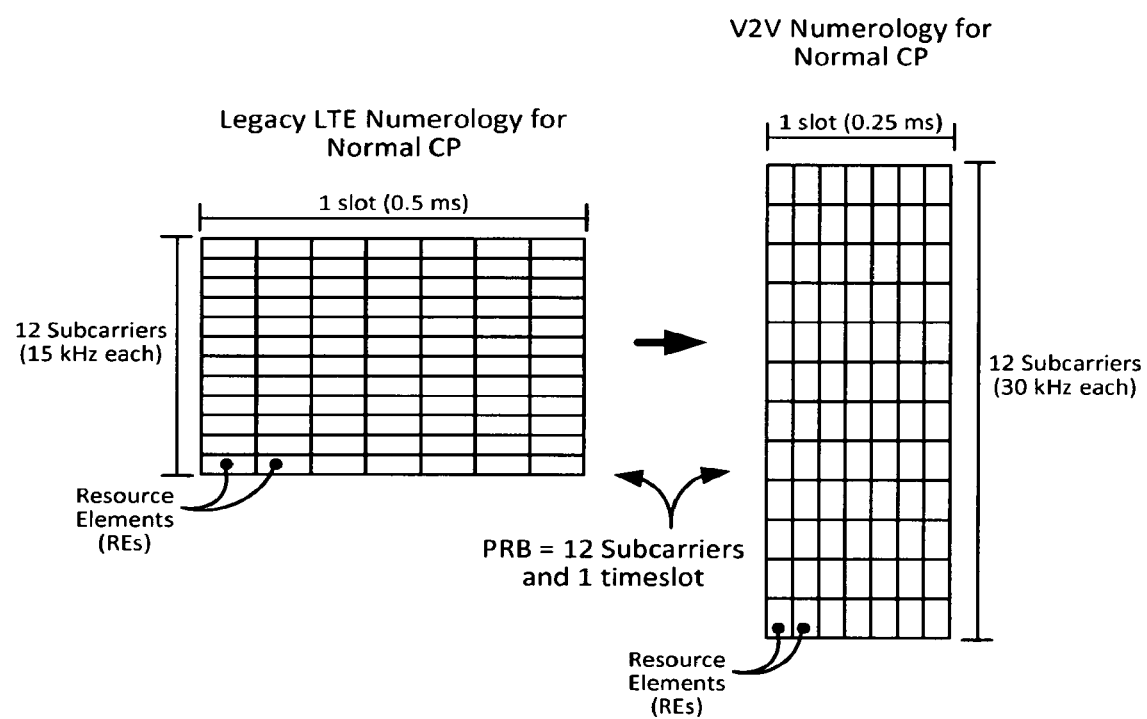
FIG. 4 is a diagram of an example physical resource block (PRB) of a legacy long term evolution (LTE) numerology and an example PRB of a vehicle-to-vehicle (V2V) numerology, under normal cyclic prefix (CP) conditions.

FIG. 4 is a diagram of an example PRB of a legacy LTE numerology and an example PRB of a V2V numerology, under normal CP conditions. The legacy LTE numerology may correspond to a legacy LTE physical channel (e.g., an LTE SL channel), while the V2V numerology may correspond to a V2V physical channel. A numerology, as discussed herein, may include parameters and characteristics of a physical channel (e.g., a legacy LTE SL channel or a V2V physical channel).

Such parameters and characteristics may include a bandwidth supported by the physical channel, a number of subcarriers per channel, a subcarrier spacing, a fast Fourier transform (FFT) size, a symbol duration, a slot duration, a subframe duration. Additional examples of numerological parameters and characteristics may include a direct, or indirect, description of a PRB and/or PRB pair of the physical channel, such as a number of subcarriers per PRB, a PRB duration (e.g., a number of slots per PRB), a number of resource elements (REs) per PRB, a number of symbols per PRB, etc.

Figure 5:
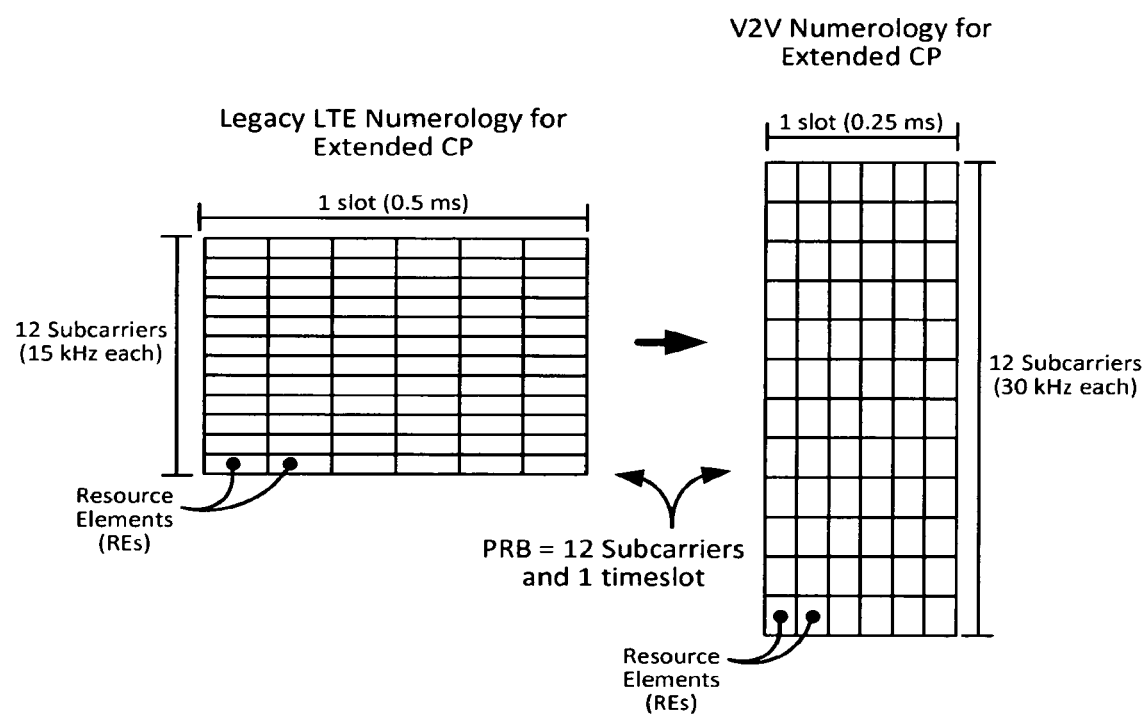
FIG. 5 is a diagram of an example PRB of a legacy LTE numerology and an example PRB of a V2V numerology, under extended CP conditions.
Figure 6:
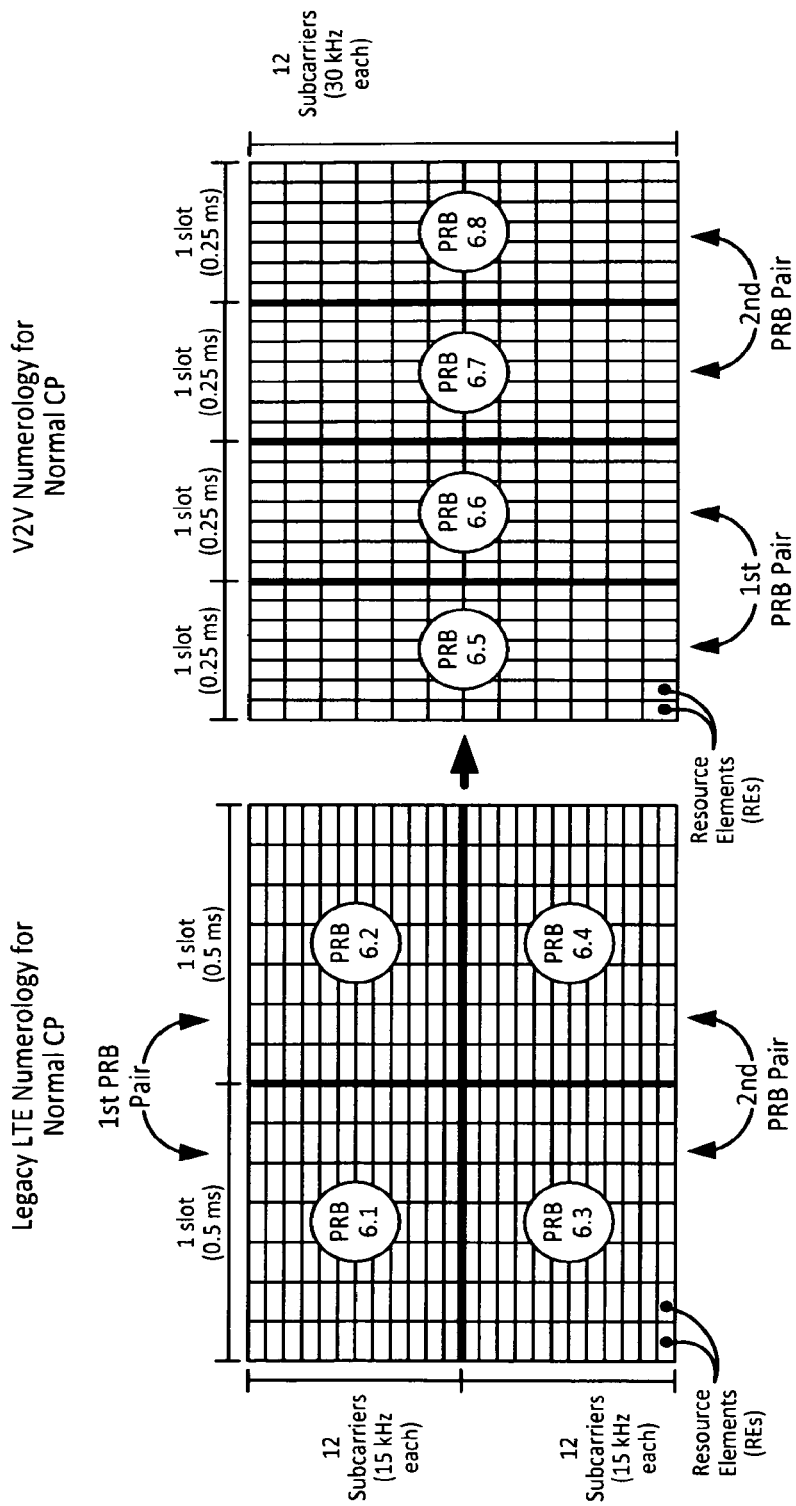
FIG. 6 is a diagram of example PRB pairs of a legacy LTE numerology and example PRB pairs of a V2V numerology, under normal CP conditions.
Figure 7:
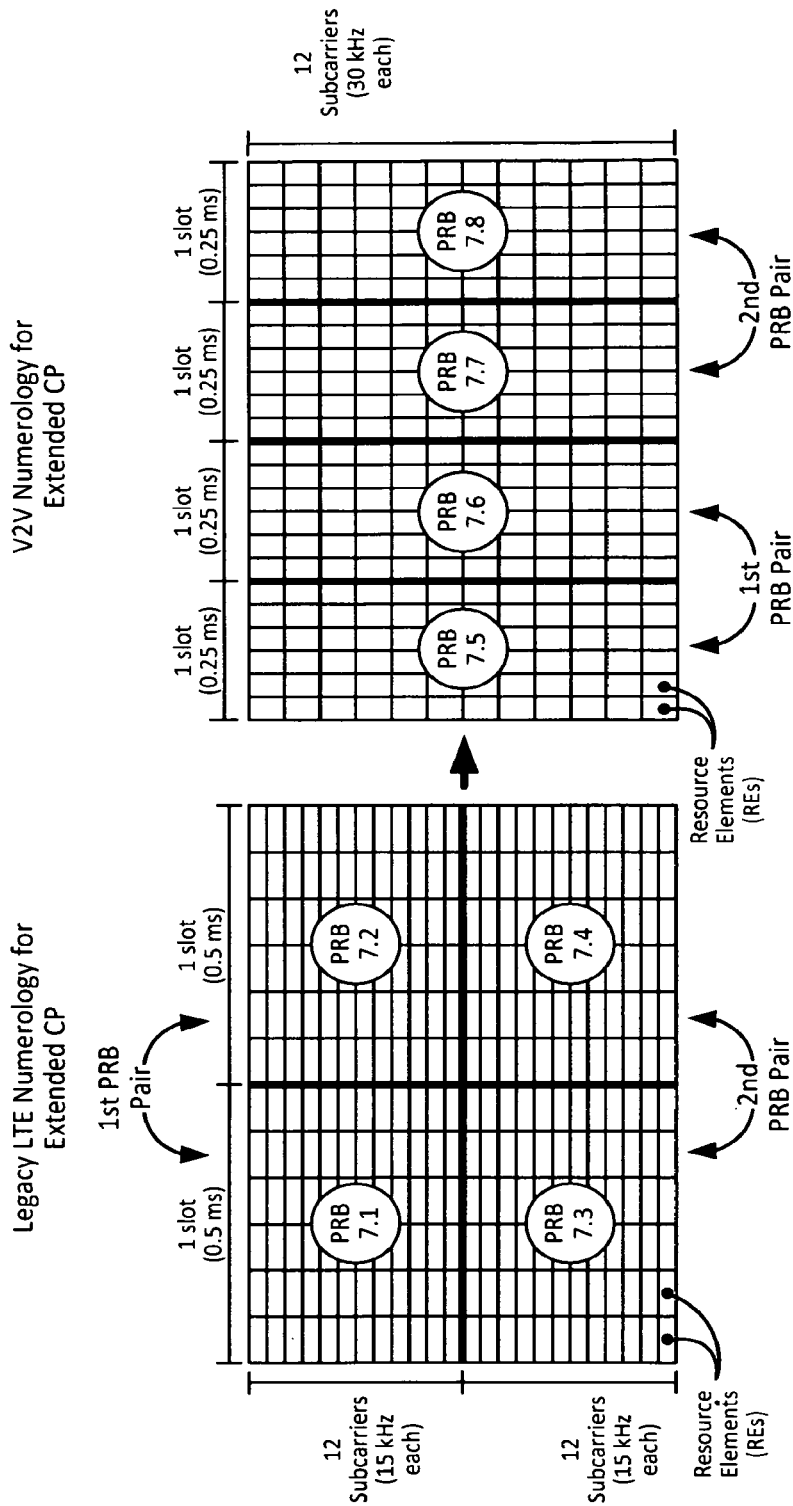
FIG. 7 is a diagram of example PRB pairs of a legacy LTE numerology and PRB pairs of a V2V numerology, under extended CP conditions.

Additionally, in the 3GPP LTE communication standard, CP may include copying a small portion of one symbol (e.g., an end portion of the symbol) and adding the copied portion to a beginning portion of the symbol, such that the symbol begins and ends with the same portion. Normal CP (as depicted in FIGS. 4 and 6) may be implemented for wireless communications over shorter distances, while extended CP (as depicted in FIGS. 5 and 7) may be implemented for wireless communications over longer distances. As such, normal CP may include a PRB of more symbols (or REs) per slot in time domain (e.g., 7), while extended CP may include a PRB of fewer symbols (or REs) per slot in time domain (e.g., 6).

As shown in FIG. 4, a PRB of the legacy LTE numerology for normal CP may include 12 subcarriers with 15 kHz subcarrier spacing, a slot of 0.5 ms in time domain comprising 7 consecutive symbols, and 84 REs in total. By contrast, the PRB of the V2V numerology for normal CP may include 12 subcarriers with 30 kHz subcarrier spacing, 1 slot of 0.25 ms in the time domain, comprising 7 consecutive symbols, and 84 REs in total. As such, each subcarrier of a V2V physical channel PRB may have twice as much subcarrier spacing as the subcarriers of the legacy LTE channel PRB; however, the duration of the slot of the V2V physical channel may be half the duration of the slot of the legacy LTE physical channel. As mentioned above, the decrease in slot duration may be accompanied by a similar decrease (e.g., a factor of 2, 4, etc.) to the FTT size associated with the V2V physical channel. Doing so may help ensure that the sampling time and/or sampling frequency of the V2V physical channel remains the same as the sampling time and sampling frequency of the legacy LTE channel.

For example, sampling time, as described herein, may include the basic time unit for the corresponding physical channel. For instance, in the 3GPP LTE communication standard, sampling time may be represented by "Ts" and may be equal to 1/(subcarrier spacing×FFT size) (e.g., 1/(1500 Hz×2048)). By contrast, sampling frequency, as described herein, may include the basic frequency unit for a particular physical channel. For example, in the 3GPP LTE communication standard, sampling frequency may be represented by "Fs" and may be equal to subcarrier spacing (e.g., 15 kHz) multiplied by the number of FFT time samples (e.g., 2048).

As described above, a V2V channel may have increased subcarrier spacing (e.g., 30 kHz or 60 kHz instead of 15 kHz) but still be implemented within the LTE framework since decreasing symbol duration and FFT size proportionally may help ensure that sampling frequency and sampling time for the V2V channel are the same as the sampling frequency and sampling time of legacy LTE channels (e.g., an LTE SL channel). For example, since sampling time is equal to the inverse of subcarrier spacing multiplied by the corresponding FFT size, increasing the subcarrier spacing by a factor of two (e.g., from 15 kHz to 30 kHz) or four (e.g., from 15 kHz to 60 kHz) does not change the sampling time so long as the FFT size is reduced by the same factor (e.g., from 2048 to 1024 for factor of two or from 2048 to 512 for factor of four). The same can be said for sampling frequency since sampling frequency may be equal to subcarrier spacing multiplied by the corresponding FFT size. As such, the arrow depicted in FIG. 4 may represent that the techniques described herein may enable legacy LTE channels to be modified (or replaced) by V2V channels (which may be more robust and reliable in high mobility conditions (e.g., that may cause high Doppler fading and/or frequency shifts)) without affecting other aspects of the LTE communications standard.

For example, in some embodiments, the duration for a single subframe of a V2V channel may be set to 0.5 ms, such that the subframe may include 2 slots at 0.25 ms each. In such an implementation, relatively few (if any) modifications to the 3GPP LTE communication standard may implement the V2V channel since, for example, legacy LTE channels also include 2 slots per subframe. In other embodiments, the duration for a single subframe of the V2V channel may be set to 1.0 ms (for example), which may result in a subframe including 4 slots at 0.25 ms each. In such embodiments, certain modifications to the 3GPP LTE communications standard may be beneficial, such as modifications to the size of transport blocks, the transport block sizes (TBS) tables, etc.

FIG. 5 is a diagram of an example PRB of a legacy LTE numerology and an example PRB of a V2V numerology, under extended CP conditions. The legacy LTE numerology may correspond to a legacy LTE channel (e.g., an LTE SL channel), while the V2V numerology may correspond to a V2V channel. As shown, a PRB of the legacy LTE numerology for extended CP may include 12 subcarriers of 15 kHz each, a slot of 0.5 ms, and 72 REs (6 symbols or (REs) per slot). By contrast, the PRB of the V2V numerology for normal CP may include 12 subcarriers of 30 kHz each, 1 slot of 0.25 ms, and 84 REs. As such, each subcarrier of a V2V channel PRB may include twice as much bandwidth as the subcarriers of the legacy LTE channel PRB; however, the slot of the V2V channel PRB may be half the duration of the slot of the legacy LTE channel PRB. As mentioned above, the decrease in slot duration may be accompanied by a similar decrease (e.g., a factor of 2, 4, etc.) to the FTT size associated with the V2V channel. The sampling frequency of the V2V channel may remain the same as the sampling frequency of the legacy LTE channel. As such, the arrow depicted in FIG. 5 may represent that the techniques described herein may enable legacy LTE channels to be modified (or replaced) by V2V channels (which may be more robust and reliable in high mobility conditions) without affecting other aspects of the LTE communications standard.

FIG. 6 is a diagram of example PRB pairs of a legacy LTE numerology and example PRB pairs of a V2V numerology, under normal CP conditions. As shown, the legacy LTE numerology and the V2V numerology may each include 4 PRBs, PRB 6.1 through PRB 6.4 and PRB 6.5 through 6.8, respectively. Each PRB of the legacy LTE numerology, and each PRB of the V2V numerology, may be similar to the corresponding PRBs discussed above with reference to FIG. 4. Additionally, the PRBs of FIG. 6 may corresponds to normal CP conditions since the PRB format includes 7 symbols (or REs) for each slot.

In the legacy LTE numerology, the PRB pairs may be differentiated from one another in the frequency domain, such that PRB 6.1 and PRB 6.2 include one pair (e.g., a 1st PRB pair) and PRB 6.3 and PRB 6.4 are another pair (e.g., a 2nd PRB pair). By contrast, in V2V numerology, the PRB pairs may be differentiated from one another in the time domain, such that PRB 6.5 and PRB 6.6 include one pair (e.g., a 1st PRB pair) and PRB 6.7 and PRB 6.8 are another pair (e.g., a 2nd PRB pair). Similar to the arrows in FIG. 4 and FIG. 5, the arrow depicted in FIG. 6 may represent that the techniques described herein may enable legacy LTE channels to be modified (or replaced) by V2V channels affecting other aspects of the LTE communications standard.

FIG. 7 is a diagram of example PRB pairs of a legacy LTE numerology and PRB pairs of a V2V numerology, under extended CP conditions. As shown, the legacy LTE numerology and the V2V numerology may each include 4 PRBs, PRB 7.1 through PRB 7.4 and PRB 7.5 through 7.8, respectively. Each PRB of the legacy LTE numerology, and each PRB of the V2V numerology, may be similar to the corresponding PRBs discussed above with reference to FIG. 5. Additionally, the PRBs of FIG. 7 may correspond to extended CP conditions since the PRB format includes 6 symbols (or REs) for each slot.

In the legacy LTE numerology, the PRB pairs may be differentiated from one another in the frequency domain, such that PRB 7.1 and PRB 7.2 include one pair (e.g., a 1st PRB pair) and PRB 6.3 and PRB 6.4 are another pair (e.g., a 2nd PRB pair). By contrast, in V2V numerology, the PRB pairs may be differentiated from one another in the time domain, such that PRB 7.5 and PRB 7.6 include one pair (e.g., a 1st PRB pair) and PRB 7.7 and PRB 7.8 are another pair (e.g., a 2nd PRB pair). Similar to the arrow in FIG. 6, the arrow depicted in FIG. 7 may represent that the techniques described herein may enable legacy LTE channels to be modified (or replaced) by V2V channels affecting other aspects of the LTE communications standard.

Figure 8A:
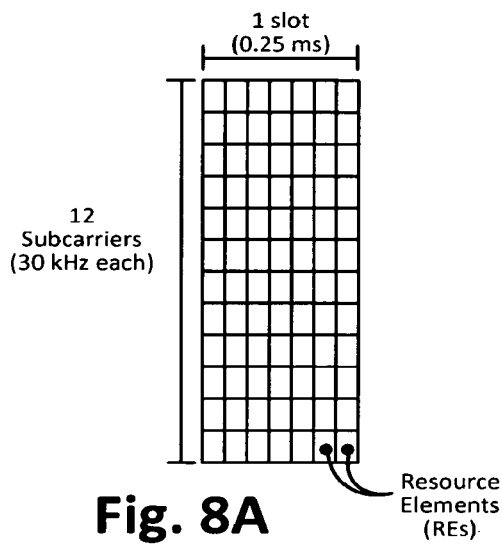
FIGS. 8A-8D are diagrams of example PRBs according to one or more embodiments described herein.
Figure 8B:
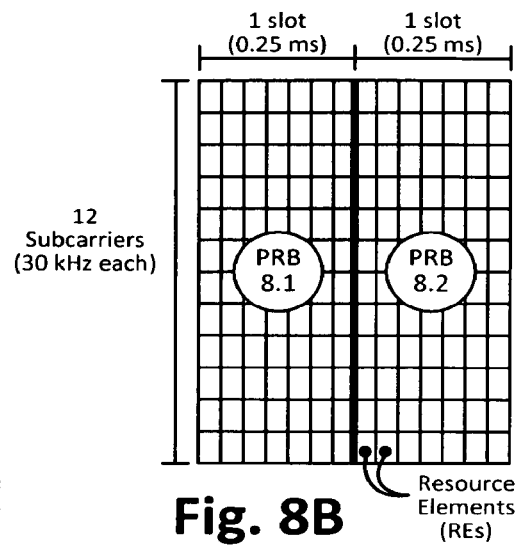
Figure 8C:
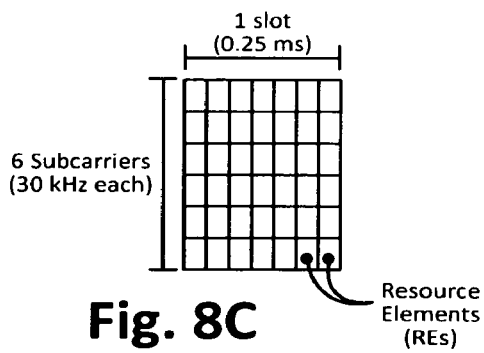
Figure 8D:
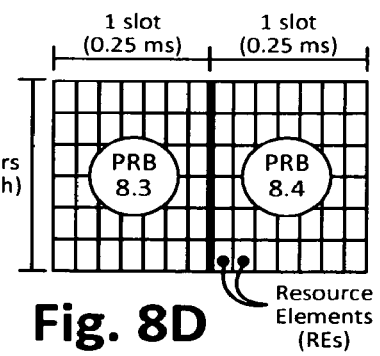

FIGS. 8A-8D are diagrams of example PRBs according to one or more embodiments described herein. Additionally, the PRBs of FIGS. 8A-8D may corresponds to normal CP conditions since each PRB includes 7 symbols per slot in time domain. The example PRB of FIG. 8A may correspond to the V2V channel PRB described above with reference to FIG. 4. The example PRBs of FIG. 8B may include a PRB pair (PRB 8.1 and PRB 8.2), similar to the V2V channel PRB pairs described above with reference to FIG. 5. FIG. 8C may include an example PRB that is similar to the PRB of FIG. 8A, except that the example PRB of FIG. 8C includes only 6 subcarriers (also, "REs in frequency" or "Frequency REs") of 30 kHz each. Similarly, FIG. 8D may include an example PRB pair (PRB 8.3 and PRB 8.4) that is similar to the PRB pair of FIG. 9B, except that the example PRBs of FIG. 8D include only 6 subcarriers with 30 kHz subcarrier spacing. In some embodiments, reducing the number of subcarriers per V2V channel may increase the number of transmission channels that may be used for V2V communications, which may in turn increase V2V system capacity (e.g., in a location with a high number of vehicles, such as a traffic jam on a freeway or major intersection).

Figure 9A:
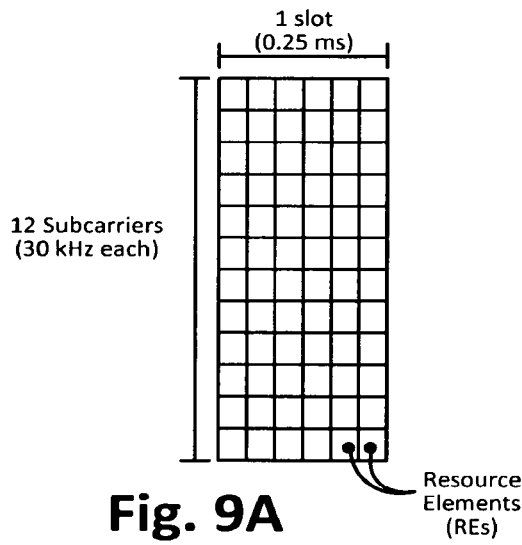
FIGS. 9A-9D are diagrams of example PRBs according to one or more embodiments described herein.
Figure 9B:
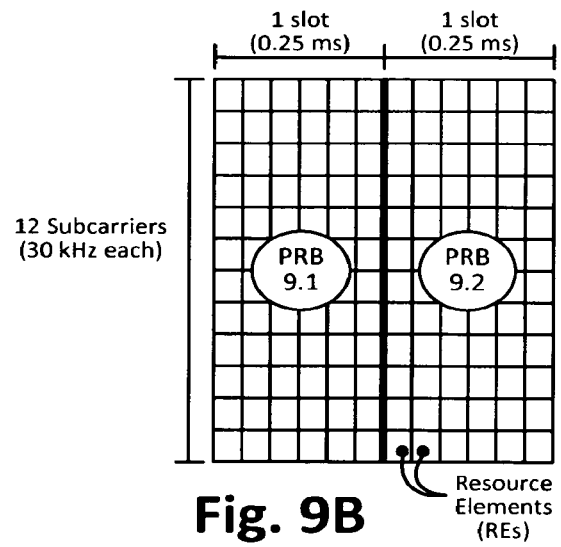
Figure 9C:
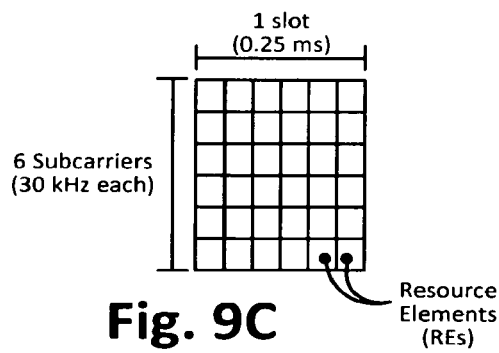
Figure 9D:
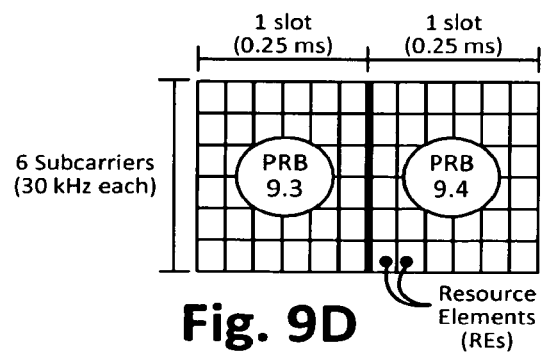

FIGS. 9A-9D are diagrams of example PRBs according to one or more embodiments described herein. Additionally, the PRBs of FIGS. 9A-9D may correspond to extended CP conditions since each PRB includes 6 symbols per slot. The example PRB of FIG. 9A may correspond to the V2V channel PRB described above with reference to FIG. 5. The example PRBs of FIG. 9B may include a PRB pair (PRB 9.1 and PRB 9.2), similar to the V2V channel PRB pairs described above with reference to FIG. 5. FIG. 9C may include an example PRB that is similar to the PRB of FIG. 9A, except that the example PRB of FIG. 9C includes only 6 subcarriers (also, "REs in frequency" or "Frequency REs") of 30 kHz each. Similarly, FIG. 9D may include an example PRB pair (PRB 9.3 and PRB 9.4) that is similar to the PRB pair of FIG. 9B, except that the example PRBs of FIG. 9D include only 6 (instead of 12) subcarriers of 30 kHz each. As described above with reference to FIGS. 8A-8D, in some embodiments, reducing the number of subcarriers per V2V channel may increase the number of transmission channels that may be used for V2V communications, which may in turn increase the level of V2V system capacity (e.g., in a location with a high number of vehicles, such as a traffic jam on a freeway or major intersection).

FIG. 10 is a table of example characteristics of a legacy LTE numerology and a V2V numerology with 30 kHz subcarrier spacing. As shown, the table of FIG. 10 includes a Channel Characteristics column, a Legacy LTE Channel Numerology column, and a V2V Channel numerology column. FIG. 10 provides a non-limiting example of differences and similarities that may exists between a legacy LTE channel and a V2V channel.

For example, a legacy LTE channel may include a subcarrier spacing of 15 kHz, while a V2V channel may include a subcarrier spacing of 30 kHz. Both channels may support the same bandwidths; however, the channels may only support some of the same FTT sizes. For instance, only the legacy LTE channel may use FTT sizes of 1536 and 2048, and the V2V channel may use FTT sizes of 64 and 768. As such, the FFT size for the legacy LTE channel may include a lower limit of 128 for the 1.4 MHz bandwidth and an upper limit of 2048 for 20 MHz bandwidth, while the FFT size for the V2V channel (with 30 kHz subcarrier spacing), may include a lower limit of 64 for 1.4 MHz bandwidth and an upper limit of 1024 for the 20 MHz bandwidth. As described above, this is due to reducing the FTT sizes for the V2V channel by the same factor (e.g., "2") that was used to increase the subcarrier spacing of the V2V channel. The following table may represent a logical relationship between different BWs, legacy LTE FFT sizes, and V2V channel FFT sizes (when the subcarrier spacing for the V2V channel is 30 kHz).

| Bandwidth | Nominal FFT Size | |
| --- | --- | --- |
| (BW) | Legacy LTE Channel | V2V Channel with 30 kHz |
| 1.4 MHz | 128 | 64 |
| 3 MHz | 256 | 128 |
| 5 MHz | 512 | 256 |
| 10 MHz | 1024 | 512 |
| 15 MHz | 1536 | 768 |
| 20 MHz | 2048 | 1024 |

Since the same factor was used to increase and decrease the subcarrier spacing and FFT size (respectively), both channels may have the same sampling time (Ts) of 32.55 nanoseconds (ns) because sampling time may be calculated by taking the inverse of the product of the subcarrier spacing and the FFT size (e.g., Ts=1/(subcarrier spacing×FFT size). In some embodiments, for similar reasons, both channels may also have the same sampling frequency (Fs) (e.g., Fs=subcarrier spacing×FFT size). As mentioned above, maintaining the same sampling time and sampling frequency as the legacy LTE channel may help ensure that the V2V channel can be implemented in an LTE environment without having to make significant adjustments to other aspects of the 3GPP LTE communication standard.

Similar to the change in FFT size, the symbol durations for the V2V channel may also be reduced by the same factor (e.g., "2") that was used to increase the subcarrier spacing of the V2V channel. As shown in FIGS. 6-7, this may enable PRBs and PRB pairs to be formatted in a manner that enables the V2V channel to reduce the slot duration by half (e.g., from 0.5 ms to 0.25 ms) and output PRBs at the same rate as the legacy LTE channel, even though the subcarrier spacing for the V2V channel was doubled. Similar to maintaining the same sampling time and sampling frequency, maintaining a similar output rate as the legacy LTE channel, may help reduce the impact of the V2V channel on other aspects of the 3GPP LTE communication standard.

Additionally, the single subframe duration for the legacy LTE channel may be 1.0 ms, whereas the single subframe duration for the V2V channel may be 0.5 or 1.0 ms. A single subframe duration of 0.5 ms may enable the V2V channel to have two slots per subframe since the slot duration for the V2V channel was reduced to 0.25 ms. Additionally, since a PRB duration may be 0.25 ms (which corresponds to 1 slot), a 0.5 ms subframe may consist of one PRB pair (i.e., two 0.25 ms PRBs). In other words, the V2V channel may have a subframe-to-PRB-pair ratio of 1:1 when the subframe duration of the V2V channel is 0.5 ms, which may reduce the impact of the V2V channel on the 3GPP LTE communication standard since, for example, the legacy LTE channel also has a subframe-to-PRB-pair ratio of 1:1.

By contrast, a single subframe duration of 1.0 ms may enable the V2V channel to have four slots per subframe since the slot duration for the V2V channel was reduced to 0.25 ms. As such, the subframe may include four slots. In other words, a subframe duration of 1.0 ms, as opposed to the 0.5 ms subframe scenario above, may give rise to a relative increase in the amount of information that may be communicated in one subframe. As a result, implementing a 1.0 ms subframe may additional modifications to the 3GPP LTE communication standard, including changes to the design of physical channels, such as modifications to the size of transport blocks, the transport block sizes (TBS) tables, etc.

As shown in FIG. 10, whether the legacy LTE channel and the V2V channel have the same number of subcarriers per PRB may depend on the scenario or embodiment. For example, both channels may have 12 subcarriers for each PRB. Additionally, or alternatively, the V2V channel may have 6 subcarriers per PRB. In some embodiments, while allocating 6 subcarriers (instead of 12) to each PRB may decrease the rate at which a channel may transmit data, doing so may also increase the number of V2V channels that are available for V2X devices 110 to communicate with other V2X devices, UEs, etc. As such, allocating 6 subcarriers to each V2V channel may be beneficial in scenarios where V2V channels might not benefit from a high data rate connections and/or a vehicle with a V2X device is in a traffic jam, rush hour traffic, or in another situation involving a lot of V2X devices 110, UEs 110, etc., that within range of one another.

FIG. 11 is a table of example characteristics of a legacy LTE numerology and a V2V numerology with 60 kHz subcarrier spacing. As shown, the table of FIG. 11 includes a Channel Characteristics column, a Legacy LTE Channel Numerology column, and a V2V Channel numerology column. FIG. 11 provides a non-limiting example of differences and similarities that may exists between a legacy LTE channel and a V2V channel.

For example, a legacy LTE channel may include a subcarrier spacing of 15 kHz, while a V2V channel may include a subcarrier spacing of 60 kHz. Both channels may support the same bandwidths; however, the channels may only support some of the same FTT sizes. For instance, only the legacy LTE channel may support FTT sizes of 1024, 1536, and 2048, and only the V2V channel may support an FTT size of 32, 64, and 384. As such, the FFT size for the legacy LTE channel may include a lower limit of 128 and an upper limit of 2048, while the FFT size for the V2V channel (with 60 kHz subcarrier spacing), may include a lower limit of 32 kHz and an upper limit of 512 kHz. This may be due to reducing the FTT sizes for the V2V channel by the same factor (e.g., "4") that was used to increase the subcarrier spacing of the V2V channel. The following table may represent a logical relationship between different BWs, legacy LTE FFT sizes, and V2V channel FFT sizes (when the subcarrier spacing for the V2V channel is 30 kHz).

| Bandwidth | Nominal FFT Size | |
|---|---|---|
| (BW) | Legacy LTE Channel | V2V Channel with 60 kHz |
| 1.5 MHz | 128 | 32 |
| 3 MHz | 256 | 64 |
| 5 MHz | 512 | 128 |
| 10 MHz | 1024 | 256 |
| 15 MHz | 1536 | 384 |
| 20 MHz | 2048 | 512 |

Since the same factor was used to increase and decrease the subcarrier spacing and FFT size (respectively), both channels may have the same sampling time (Ts) of 32.55 nanoseconds (ns) because sampling time may be calculated by taking the inverse of the product of the subcarrier spacing and the FFT size (e.g., Ts=1/(subcarrier spacing×FFT size). In some embodiments, for similar reasons, both channels may also have the same sampling frequency (Fs) (e.g., Fs=subcarrier spacing×FFT size). As mentioned above, maintaining the same sampling time and sampling frequency as the legacy LTE channel may help ensure that the V2V channel can be implemented in an LTE environment without having to make significant adjustments to other aspects of the 3GPP LTE communication standard.

Similar to the change in FFT size, the symbol durations for the V2V channel may also be reduced by the same factor (e.g., "4") that was used to increase the subcarrier spacing of the V2V channel. This may enable PRBs and PRB pairs to be formatted in a manner that enables the V2V channel to reduce the slot duration by one-fourth (e.g., from 1.0 ms to 0.125 ms) and output PRBs at the same rate as the legacy LTE channel, even though the subcarrier spacing for the V2V channel was quadrupled. Similar to maintaining the same sampling time and sampling frequency, maintaining a similar output rate as the legacy LTE channel, may help reduce the impact of the V2V channel on other aspects of the 3GPP LTE communication standard.

Additionally, the single subframe duration for the legacy LTE channel may be 1.0 ms, whereas the single subframe duration for the V2V channel may be 0.25 or 1.0 ms. A single subframe duration of 0.25 ms may enable the V2V channel to have two slots per subframe since the slot duration for the V2V channel was reduced to 0.125 ms. Additionally, since a PRB duration may be 0.125 ms (which corresponds to 1 slot), a 0.25 ms subframe may consist of one PRB pair (i.e., two 0.125 ms PRBs). In other words, the V2V channel may have a subframe-to-PRB-pair ratio of 1:1 when the subframe duration of the V2V channel is 0.25 ms, which may reduce the impact of the V2V channel on the 3GPP LTE communication standard since, for example, the legacy LTE channel also has a subframe-to-PRB-pair ratio of 1:1.

By contrast, a single subframe duration of 1.0 ms may enable the V2V channel to have eight slots per subframe since the slot duration for the V2V channel was reduced to 0.125 ms. As such, the subframe may include eight slots. In other words, a subframe duration of 1.0 ms, as opposed to the 0.25 ms subframe scenario above, may give rise to a relative increase in the amount of information that may be communicated in one subframe. As a result, implementing a 1.0 ms subframe may additional modifications to the 3GPP LTE communication standard, including changes to the design of physical channels, such as modifications to the size of transport blocks, the transport block sizes (TBS) tables, etc.

As shown in FIG. 11, whether the legacy LTE channel and the V2V channel have the same number of subcarriers per PRB may depend on the scenario or embodiment. For example, both channels may have 12 subcarriers for each PRB. Additionally, or alternatively, the V2V channel may have 3 or 6 subcarriers per PRB. In some embodiments, while allocating 3 or 6 subcarriers (instead of 12) to each PRB may decrease the rate at which a channel may transmit data, doing so may also increase the number of V2V channels that are available for V2X devices 110 to communicate with other V2X devices, UEs, etc. As such, allocating 3 or 6 subcarriers to each V2V channel may be beneficial in scenarios where V2V channels might not benefit from high data rate connections and/or a vehicle with a V2X device is in a traffic jam, rush hour traffic, or in another situation involving a lot of V2X devices 110, UEs 110, etc., that within range of one another.

Figure 12:
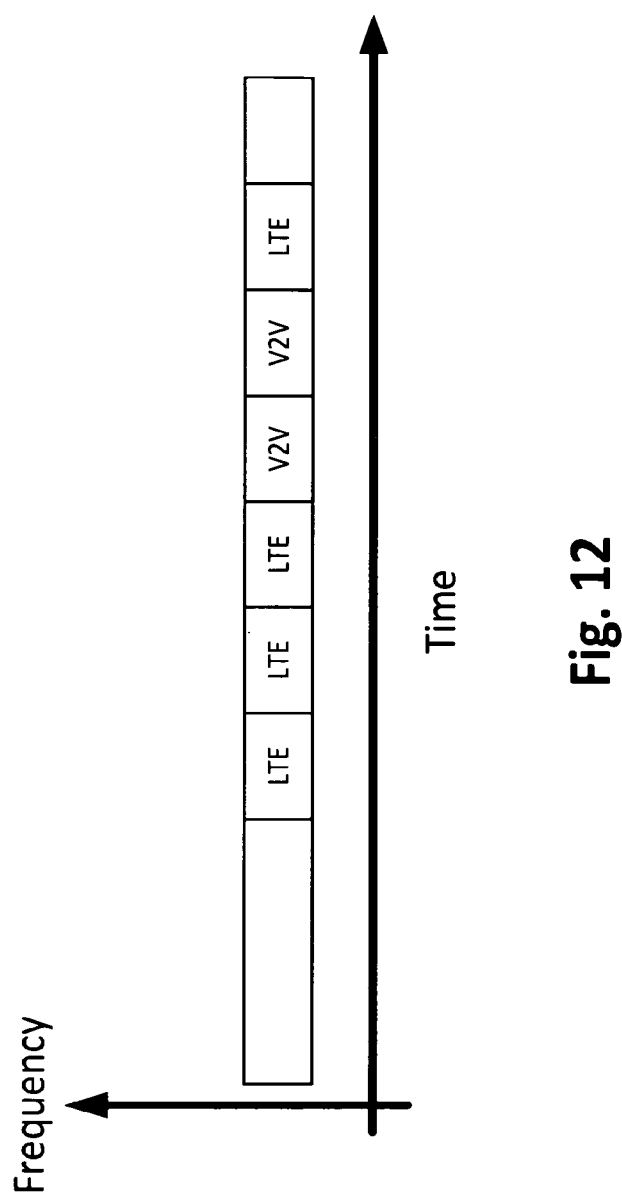
FIG. 12 is a table representing an example of legacy LTE and V2V transmission multiplexing.

FIG. 12 is a table representing an example of legacy LTE and V2V transmission multiplexing. As shown, FIG. 12 may include a vertical axis representing frequency and a horizontal axis representing time. V2V devices 110, UEs 110, etc., may support both legacy and V2V PHY numerologies (e.g. for cellular and V2V operation). Time domain multiplexing of legacy and V2V transmissions at one UE 110 may be used for these purposes. To facilitate efficient use of resources the minimum granularity for time domain multiplexing may be a multiple of legacy subframe granularity (e.g., 1.0 ms).

In one example, subframes for legacy LTE and V2V operation may be semi-statically, higher-layer configured, by an eNB (e.g., via radio resource control (RRC) protocol), on a per V2V device basis (or V2V device group basis). Semi-statically may include, for example, physical channels that are predefined by the eNB and assigned to a particular V2V device 210 or UE in a given scenario. In another example, subframes for legacy LTE and V2V operation may be dynamically assigned. In yet another example, subframes for legacy LTE and V2V operation may be specified by a communications standard (such as the 3GPP LTE communication standard).

A V2V transmissions (e.g., transmissions with a V2V numerology) may take place in either TDD or FDD modes. In the latter case, the transmissions may be configured in either a DL or a UL spectrum and can be configured independently (e.g., V2V transmissions on a UL spectrum may not impose use of V2V numerology in a DL spectrum in the same time resources).

In some embodiments, V2V device 110, UE 110, etc., may implement an autonomous selection capability for the numerology for the V2V transmissions (e.g., either a legacy LTE numerology or a V2V numerology) based on one or more instructions, conditions, or other criteria. As such, a V2V receiver (or another type of communication component) may either be informed on the type of the transmission in advance or may dynamically detect the transmission type. In embodiments where the transmission type is dynamically detected, a receiver (or another component of V2V device 110) may attempt to receive information under different hypothesis simultaneously (e.g., attempt to receive a signal under both a 15 kHz subcarrier spacing assumption and a 30 kHz subcarrier spacing assumptions)

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 13:
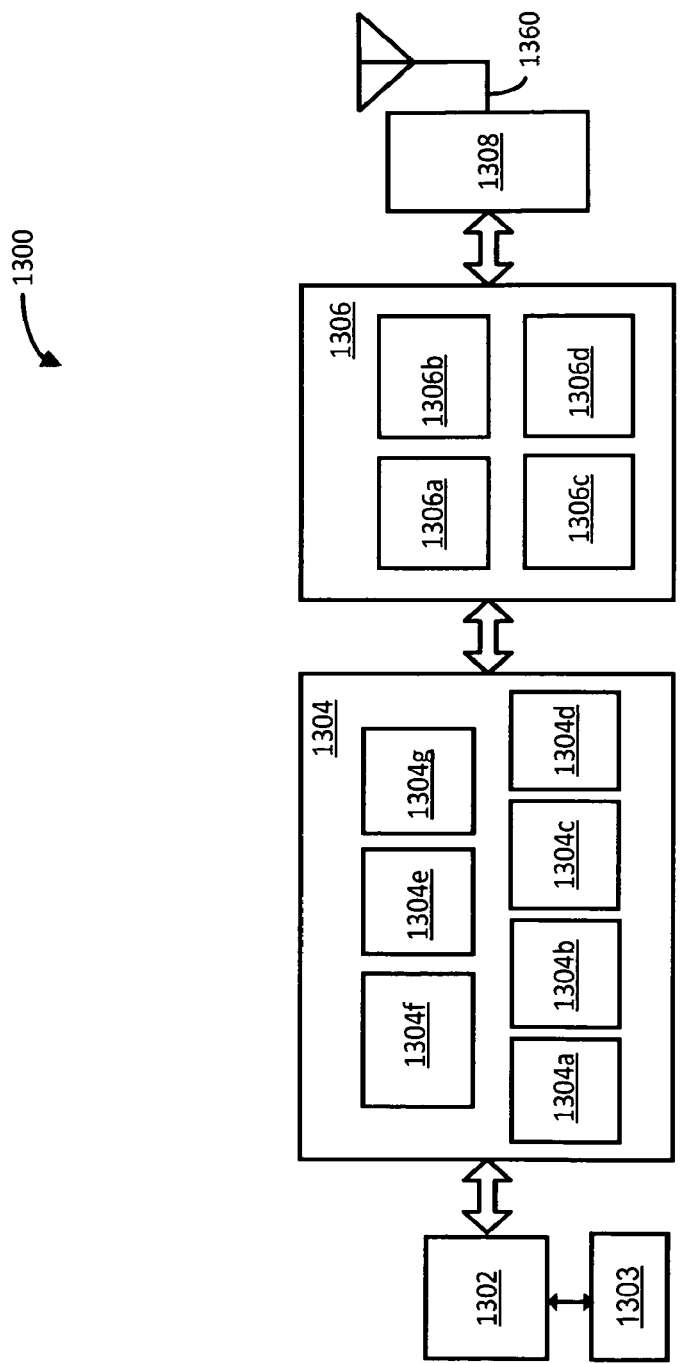
FIG. 13 illustrates, for one embodiment, example components of an electronic device.

Embodiments described herein may be implemented into a system using any suitably configured hardware and/or software. FIG. 13 illustrates, for one embodiment, example components of an electronic device 1300. In embodiments, the electronic device 1300 may be a UE, an eNB, a WLAN AP, or some other appropriate electronic device. In some embodiments, the electronic device 1300 may include application circuitry 1302, baseband circuitry 1304, Radio Frequency (RF) circuitry 1306, front-end module (FEM) circuitry 1308 and one or more antennas 1360, coupled together at least as shown.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage, such as storage medium 1303, and may be configured to execute instructions stored in the memory/storage to enable various applications and/or operating systems to run on the system. In some implementations, storage medium 1303 may include a non-transitory computer-readable medium. Application circuitry 1302 may, in some embodiments, connect to or include one or more sensors, such as environmental sensors, cameras, etc.

Baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304a, third generation (3G) baseband processor 1304b, fourth generation (4G) baseband processor 1304c, and/or other baseband processor(s) 1304d for other existing generations, generations in development or to be developed in the future (e.g., fifth generation (5G), 6G, etc.). The baseband circuitry 1304 (e.g., one or more of baseband processors 1304a-d) may handle various radio control functions that enable communication with one or more radio networks via the RF circuitry 1306. The radio control functions may include, but are not limited to, signal modulation/demodulation, encoding/decoding, radio frequency shifting, etc. In some implementations, baseband circuitry 1304 may be associated with storage medium 1303 or with another storage medium.

In some embodiments, modulation/demodulation circuitry of the baseband circuitry 1304 may include FFT, precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. In some embodiments, the baseband circuitry 1304 may include elements of a protocol stack such as, for example, elements of an evolved universal terrestrial radio access network (E-UTRAN) protocol including, for example, physical (PHY), MAC, radio link control (RLC), packet data convergence protocol (PDCP), and/or radio resource control (RRC) elements. A central processing unit (CPU) 1304e of the baseband circuitry 1304 may be configured to run elements of the protocol stack for signaling of the PHY, MAC, RLC, PDCP and/or RRC layers. In some embodiments, the baseband circuitry may include one or more audio digital signal processor(s) (DSP) 1304f. The audio DSP(s) 1304f may be include elements for compression/decompression and echo cancellation and may include other suitable processing elements in other embodiments.

The baseband circuitry 1304 may further include memory/storage 1304g. The memory/storage 1304g may be used to load and store data and/or instructions for operations performed by the processors of the baseband circuitry 1304. Memory/storage for one embodiment may include any combination of suitable volatile memory and/or non-volatile memory. The memory/storage 1304g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 1304g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an E-UTRAN and/or other wireless metropolitan area networks (WMAN), a WLAN, a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306a, amplifier circuitry 1306b and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals.

Output baseband signals may be provided to the baseband circuitry 1304 for further processing. In some embodiments, the output baseband signals may be zero-frequency baseband signals. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the embodiments is not limited in this respect.

In some embodiments, the mixer circuitry 1306a of the receive signal path and the mixer circuitry 1306a of the transmit signal path may include two or more mixers and may be arranged for quadrature downconversion and/or upconversion respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and/or direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+6 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+6 synthesizer.

In some embodiments, frequency input may be provided by a voltage controlled oscillator (VCO. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1360, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1360.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1360.

In some embodiments, the electronic device 1300 may include additional elements such as, for example, memory/storage, display, camera, sensors, and/or input/output (I/O) interface. In some embodiments, the electronic device of FIG. 13 may be configured to perform one or more methods, processes, and/or techniques such as those described herein.

A number of examples, relating to embodiments of the techniques described above, will next be given.

In a first example, a communication device may comprise: a radio frequency (RF) circuitry to communicate with other communication devices via a physical channel; and baseband circuitry to cause the RF circuitry to communicate with another communication device via the physical channel, the physical channel including: a single-carrier frequency-division multiple access (SC-FDMA) symbol duration (SC-FDMA) or an orthogonal frequency division multiplexing (OFDM) waveform, a subcarrier spacing of at least 30 kilohertz (kHz) in a frequency domain, and a symbol duration of 0.042 milliseconds (ms) or less in a time domain.

In example 2, the subject matter of example 1, or any of the examples herein, may further include wherein a physical resource block (PRB), corresponding to a signal of the physical channel, includes 12 subcarriers in a frequency domain with 30 kHz or with 60 kHz subcarrier spacing.

In example 3, the subject matter of example 1, or any of the examples herein, may further include wherein a PRB, corresponding to the physical channel, includes 6 subcarriers in frequency domain with 30 kHz subcarrier spacing or 3 subcarriers with 60 kHz subcarrier spacing.

In example 4, the subject matter of example 1, or any of the examples herein, may further include wherein two PRBs form a PRB pair, of the physical channel, that corresponds to two consecutive PRBs in a time-domain.

In example 5, the subject matter of example 1, or any of the examples herein, may further include wherein the physical channel corresponds to at least one of: a vehicle-to-vehicle (V2V) communication, a vehicular-to-infrastructure (V2I) communication, or a vehicular-to-pedestrian (V2P) communication.

In example 6, the subject matter of example 1, or any of the examples herein, may further include wherein the physical channel corresponds to at least one of: an long-term evolution (LTE) sidelink (SL) physical channels, an LTE downlink (DL) physical channels, or an LTE uplink (UL) physical channels.

In a seventh example, an apparatus for a wireless communication device may comprise: a radio (RF) circuitry to communicate with other communication devices via a physical channel; and a baseband circuitry to: use a physical channel, from a plurality of physical channel types, that is appropriate for communicating with the other wireless communication devices, the plurality of physical channel types including: a long-term evolution (LTE) physical channel, and a V2V physical channel that includes: a bandwidth that is at least as large as a bandwidth of the LTE physical channel; a subcarrier spacing that is greater, by a preselected factor, than a subcarrier spacing corresponding to the LTE physical channel, a fast Fourier transform (FFT) size that is less, by the preselected factor, than an FFT size corresponding to the LTE physical channel, a symbol duration that is less, by the preselected factor, than a symbol duration corresponding to the LTE physical channel, and a sampling frequency that is equal to a sampling frequency of the LTE physical channel, and a sampling time that is equal to a sampling time of the LTE physical channel; and communicate with the other wireless communication devices via the V2V physical channel.

In example 8, the subject matter of example 7, or any of the examples herein, may further include wherein the physical channel corresponds to at least one of: an LTE sidelink (SL) physical channels, an LTE downlink (DL) physical channels, or an LTE uplink (UL) physical channels.

In example 9, the subject matter of example 7, or any of the examples herein, may further include wherein the V2V physical channel includes physical resource blocks (PRBs) that each include a number of subcarriers that is less than, or equal to, a number of subcarriers of the PRBs of the LTE physical channel.

In example 10, the subject matter of example 7, or any of the examples herein, may further include wherein: the subcarrier spacing for the V2V physical channel is 30 or 60 kilohertz (kHz); and the subcarrier spacing for the LTE physical channel is 15 kHz.

In example 11, the subject matter of example 7, or any of the examples herein, may further include wherein, for normal cyclic prefix (CP) conditions and extended CP conditions, a number of resource elements (REs) and a number of single-carrier frequency-division multiple access (SC-FDMA) or orthogonal frequency division multiplexing (OFDM) symbols per a physical resource block (PRB) of the V2V physical channel is equal to the number of REs and a number of SC-FDMA or OFDM symbols per PRB of the LTE physical channel.

In example 12, the subject matter of example 7, or any of the examples herein, may further include wherein application circuitry is to: communicate with a user equipment device (UE) of a vehicle via a vehicle-to-vehicle (V2V) connection, communicate with a UE of a user via a vehicle-to-pedestrian (V2P) connection, or communicate with a wireless telecommunications network via a vehicle-to-infrastructure (V2I) connection.

In example 13, the subject matter of example 7, or any of the examples herein, may further include wherein the baseband circuitry uses the type of physical channel that is appropriate for communicating with the other wireless communication device based on at least one of: a likelihood of communications, between the wireless communication device and the other wireless communication device being subjected to high mobility conditions, whether the other wireless communication device is capable of communicating via the LTE physical channel or the V2V physical channel, an availability, of the LTE physical channel or the V2V physical channel, for communicating with the other wireless communication device, a measure of importance regarding information that will be communicated to the other wireless communication device, or a preselected priority for communicating via the LTE physical channel or the V2V physical channel.

In example 14, the subject matter of example 7, or any of the examples herein, may further include wherein the baseband circuitry is configured, by via an eNB, to use the V2V physical channel or the LTE physical channel.

In example 15, the subject matter of example 7, or any of the examples herein, may further include wherein the baseband circuitry uses time-division multiplexing of the V2V physical channel and the LTE physical channel to communicate in different subframes.

In example 16, the subject matter of example 7, or any of the examples herein, may further include wherein subframes for the V2V physical channel and the LTE physical channel are semi-statically configured by an eNB.

In a seventeenth example, a wireless communication device as in the first or seventh examples, wherein a physical resource block (PRB), corresponding to the vehicle-to-vehicle (V2V) physical channel, includes: 7 consecutive single-carrier frequency-division multiple access (SC-FDMA) or orthogonal frequency division multiplexing (OFDM) symbols in time domain under normal cyclic prefix (CP) conditions, and 6 consecutive SC-FDMA or OFDM symbols in time domain under extended CP conditions.

In example 18, the subject matter of example 17, or any of the examples herein, may further include a subframe, corresponding to the V2V physical channel, includes two slots, a physical resource block (PRB), corresponding to the V2V physical channel, contains one slot; and a subframe duration, corresponding to the V2V physical channel, is equal to at least one of: 0.5 milliseconds (ms) and a slot duration is 0.25 ms when subcarrier spacing for the V2V physical channel is 30 kilohertz (kHz); or 0.25 milliseconds (ms) and a slot duration is 0.125 ms when subcarrier spacing for the V2V physical channel is 60 kilohertz (kHz).

In example 19, the subject matter of example 17, or any of the examples herein, may further include a subframe duration, corresponding to the vehicle-to-vehicle (V2V) physical channel, is equal to 1.0 ms, and the subframe, corresponding to the V2V physical channel, includes four slots with 0.25 ms duration and a physical resource block (PRB), corresponding to the V2V physical channel, contains two slots when subcarrier spacing for the V2V physical channel is 30 kilohertz (kHz), or the subframe, corresponding to the V2V physical channel, includes eight slots with 0.125 ms duration and a physical resource block (PRB), corresponding to the V2V physical channel, contains four slots when subcarrier spacing for the V2V physical channel is 60 kHz.

In a twentieth example, a computer readable medium may contain program instructions for causing one or more processors to: communicate with other communication devices via a physical channel, the physical channel including: a single-carrier frequency-division multiple access (SC-FDMA) symbol duration (SC-FDMA) or an orthogonal frequency division multiplexing (OFDM) waveform, a subcarrier spacing of at least 30 kilohertz (kHz) in a frequency domain, and a symbol duration of 0.042 milliseconds (ms) or less in a time domain.

In example 21, the subject matter of example 20, or any of the examples herein, may further include wherein a physical resource block (PRB), corresponding to a signal of the physical channel, includes 12 subcarriers in a frequency domain with 30 kHz or with 60 kHz subcarrier spacing.

In example 22, the subject matter of example 20, or any of the examples herein, may further include wherein a PRB, corresponding to the physical channel, includes 6 subcarriers in frequency domain with 30 kHz subcarrier spacing or 3 subcarriers with 60 kHz subcarrier spacing.

In example 23, the subject matter of example 20, or any of the examples herein, may further include wherein the physical channel corresponds to at least one of: a vehicle-to-vehicle (V2V) communication, a vehicular-to-infrastructure (V2I) communication, or a vehicular-to-pedestrian (V2P) communication.

In example 24, the subject matter of example 20, or any of the examples herein, may further include wherein the physical channel corresponds to at least one of: an LTE sidelink (SL) physical channels, an LTE downlink (DL) physical channels, or an LTE uplink (UL) physical channels.

In example 25, the subject matter of example 20, or any of the examples herein, may further include wherein two PRBs form a PRB pair, of the physical channel, that corresponds to two consecutive PRBs in a time-domain.

In a twenty-sixth example, a communication device may comprise: a means for communicating with other communication devices via a physical channel; and a means for causing the means for communicating to communicate with another communication device via the physical channel, the physical channel including: a single-carrier frequency-division multiple access (SC-FDMA) symbol duration (SC-FDMA) or an orthogonal frequency division multiplexing (OFDM) waveform, a subcarrier spacing of at least 30 kilohertz (kHz) in a frequency domain, and a symbol duration of 0.042 milliseconds (ms) or less in a time domain.

In example 27, the subject matter of example 26, or any of the examples herein, may further include wherein a physical resource block (PRB), corresponding to a signal of the physical channel, includes 12 subcarriers in a frequency domain with 30 kHz or with 60 kHz subcarrier spacing.

In example 28, the subject matter of example 26, or any of the examples herein, may further include wherein a PRB, corresponding to the physical channel, includes 6 subcarriers in frequency domain with 30 kHz subcarrier spacing or 3 subcarriers with 60 kHz subcarrier spacing.

In example 29, the subject matter of example 26, or any of the examples herein, may further include wherein two PRBs form a PRB pair, of the physical channel, that corresponds to two consecutive PRBs in a time-domain.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 3-4, the order of the signals and/or operations may be modified in other embodiments. Further, non-dependent signals may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit ("ASIC") or a field programmable gate array ("FPGA"), or a combination of hardware and software.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. A communication device, comprising:
   a memory; and
   one or more processors configured to, when executing instructions stored in the memory, cause the communication device to:
      communicate using a physical channel, wherein:
         a physical resource block (PRB), corresponding to a signal of the physical channel, includes 12 subcarriers in the frequency domain with 30 kHz, 60 kHz, or 120 kHz subcarrier spacing, and
         a PRB of 12 subcarriers is with 60 kHz subcarrier spacing and 48 symbols per subframe for extended cyclic prefix (CP) scenarios.

2. The communication device of claim 1, wherein two PRBs form a PRB pair, of the physical channel, that corresponds to two consecutive PRBs in a time-domain.

3. The communication device of claim 1, wherein the physical channel corresponds to vehicle-to-vehicle (V2V) communications.

4. The communication device of claim 1, wherein the physical channel corresponds to a sidelink (SL) physical channel.

5. The communication device of claim 1, wherein the physical channel corresponds to a downlink (DL) physical channel.

6. The communication device of claim 1, wherein the physical channel corresponds to an uplink (UL) physical channel.

7. The communication device of claim 1, wherein the physical channel corresponds to a new radio (NR) physical channel.

8. A method, performed by a communication device, comprising:
   communicating using a physical channel, wherein:
      a physical resource block (PRB), corresponding to a signal of the physical channel, includes 12 subcarriers in the frequency domain with 30 kHz, 60 kHz, or 120 kHz subcarrier spacing, and
      a PRB of 12 subcarriers is with 60 kHz subcarrier spacing and 48 symbols per subframe for extended cyclic prefix (CP) scenarios.

9. The method of claim 8, wherein two PRBs form a PRB pair, of the physical channel, that corresponds to two consecutive PRBs in a time-domain.

10. The method of claim 8, wherein the physical channel corresponds to vehicle-to-vehicle (V2V) communications.

11. The method of claim 8, wherein the physical channel corresponds to a sidelink (SL) physical channel.

12. The method of claim 8, wherein the physical channel corresponds to a downlink (DL) physical channel.

13. The method of claim 8, wherein the physical channel corresponds to an uplink (UL) physical channel.

14. The method of claim 8, wherein the physical channel corresponds to a new radio (NR) physical channel.

15. A baseband processor of a communication device, configured to cause the communication device to:
   communicate using a physical channel, wherein:
      a physical resource block (PRB), corresponding to a signal of the physical channel, includes 12 subcarriers in the frequency domain with 30 kHz, 60 kHz, or 120 kHz subcarrier spacing, and
      a PRB of 12 subcarriers is with 60 kHz subcarrier spacing and 48 symbols per subframe for extended cyclic prefix (CP) scenarios.

16. The baseband processor of claim 15, wherein two PRBs form a PRB pair, of the physical channel, that corresponds to two consecutive PRBs in a time-domain.

17. The baseband processor of claim 15, wherein the physical channel corresponds to vehicle-to-vehicle (V2V) communications.

18. The baseband processor of claim 15, wherein the physical channel corresponds to a sidelink (SL) physical channel.

19. The baseband processor of claim 15, wherein the physical channel corresponds to a downlink (DL) physical channel.

20. The baseband processor of claim 15, wherein the physical channel corresponds to an uplink (UL) physical channel.

21. The baseband processor of claim 15, wherein the physical channel corresponds to a new radio (NR) physical channel.

* * * * *